United States Patent
Scoville et al.

(10) Patent No.: US 10,647,544 B2
(45) Date of Patent: May 12, 2020

(54) ELEVATOR NOTIFICATIONS ON MOBILE DEVICE ASSOCIATED WITH USER IDENTIFICATION DEVICE

(71) Applicant: Otis Elevator Company, Farmington, CT (US)

(72) Inventors: Bradley Armand Scoville, Farmington, CT (US); Paul A. Simcik, Southington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 354 days.

(21) Appl. No.: 15/613,968

(22) Filed: Jun. 5, 2017

(65) Prior Publication Data

US 2018/0346283 A1    Dec. 6, 2018

(51) Int. Cl.
*B66B 1/00*    (2006.01)
*B66B 1/34*    (2006.01)
(Continued)

(52) U.S. Cl.
CPC .......... *B66B 1/3461* (2013.01); *B66B 1/2458* (2013.01); *B66B 1/468* (2013.01); *B66B 5/0012* (2013.01); *G06F 21/31* (2013.01); *H04W 4/023* (2013.01); *B66B 2201/4653* (2013.01); *B66B 2201/4676* (2013.01)

(58) Field of Classification Search
CPC .............. B66B 2201/463; B66B 1/468; B66B 2201/4653; B66B 2201/4676; B66B 2201/4607
See application file for complete search history.

(56) References Cited

U.S. PATENT DOCUMENTS 4,691,808 A  9/1987 Nowak et al.
6,109,396 A  8/2000 Sirag et al.
(Continued)

FOREIGN PATENT DOCUMENTS

CN  1903687 A  1/2007
CN  103159094 A  6/2013
(Continued)

OTHER PUBLICATIONS

Search Report for European Application No. 18175750.1; Application Filing Date Jun. 4, 2018; dated Nov. 21, 2018 (7 pages).

(Continued)

*Primary Examiner* — Marlon T Fletcher
(74) *Attorney, Agent, or Firm* — Cantor Colburn LLP (57) ABSTRACT

An elevator dispatch control system includes an electronic UserID detection device that detects a UserID device and extracts a device identifier associated with the UserID device. An electronic ride request unit detects a ride request of a user. An electronic elevator controller is in communication with the UserID device and the ride request unit. The elevator controller determines contact information of the user based on a comparison between the extracted device identifier and a plurality of stored device identifiers stored in a database. The elevator controller transmits elevator car assignment information to the user device associated with the UserID device based on the determined contact information.

15 Claims, 3 Drawing Sheets

(51) Int. Cl.
*B66B 1/46* (2006.01)
*B66B 5/00* (2006.01)
*H04W 4/02* (2018.01)
*B66B 1/24* (2006.01)
*G06F 21/31* (2013.01)

(56) References Cited

U.S. PATENT DOCUMENTS

| | | | |
|---|---|---|---|
| 6,202,799 B1 | 3/2001 | Drop | |
| 6,209,685 B1 | 4/2001 | Zaharia et al. | |
| 6,397,976 B1 | 6/2002 | Hale et al. | |
| 7,328,775 B2 | 2/2008 | Zaharia et al. | |
| 7,353,915 B2 | 4/2008 | Zaharia et al. | |
| 7,377,364 B2 | 5/2008 | Tyni | |
| 7,500,544 B2 | 3/2009 | Hakala | |
| 7,549,517 B2 | 6/2009 | Stanley et al. | |
| 7,711,565 B1 | 5/2010 | Gazdzinski | |
| 7,921,968 B2 | 4/2011 | Stanley et al. | |
| 7,958,971 B2 | 6/2011 | Mangini et al. | |
| 8,028,806 B2 | 10/2011 | Stanley et al. | |
| 8,047,334 B2 | 11/2011 | Christy et al. | |
| 8,136,636 B2 | 3/2012 | Bahjat et al. | |
| 8,151,942 B2* | 4/2012 | Rusanen | B66B 1/468 187/247 |
| 8,177,036 B2 | 5/2012 | Stanley et al. | |
| 8,756,655 B2 | 6/2014 | Hoesl | |
| 8,791,790 B2 | 7/2014 | Robertson | |
| 9,007,172 B2 | 4/2015 | Kukoyi | |
| 9,087,246 B1 | 7/2015 | Chin | |
| 9,284,158 B2 | 3/2016 | Sarjanen | |
| 2006/0144644 A1* | 7/2006 | Chiba | B66B 1/34 187/380 |
| 2007/0045051 A1 | 3/2007 | Gerstenkorn | |
| 2007/0200665 A1 | 8/2007 | Studerus | |
| 2012/0211309 A1* | 8/2012 | Tokura | B66B 1/468 187/247 |
| 2012/0228065 A1* | 9/2012 | Tokura | B66B 1/468 187/384 |
| 2012/0279808 A1 | 11/2012 | Terry | |
| 2013/0168190 A1 | 7/2013 | Christy et al. | |
| 2015/0034426 A1 | 2/2015 | Armistead | |
| 2015/0045956 A1 | 2/2015 | Joyce et al. | |
| 2015/0368067 A1 | 12/2015 | Tang | |
| 2016/0031675 A1 | 2/2016 | Silvennoinen | |
| 2016/0090270 A1* | 3/2016 | Wang | B66B 1/468 187/388 |
| 2016/0090271 A1* | 3/2016 | Silvennoinen | B66B 1/468 187/387 |
| 2016/0122157 A1* | 5/2016 | Keser | B66B 1/468 187/388 |
| 2016/0130113 A1 | 5/2016 | Tokura | |
| 2016/0221791 A1 | 8/2016 | Berryhill | |
| 2016/0304312 A1 | 10/2016 | Thompson | |
| 2016/0364927 A1 | 12/2016 | Barry | |
| 2016/0376124 A1* | 12/2016 | Bunter | B66B 1/468 187/247 |
| 2017/0217727 A1 | 8/2017 | Scoville et al. | |

FOREIGN PATENT DOCUMENTS

| | | |
|---|---|---|
| CN | 203486688 U | 3/2014 |
| CN | 203720862 U | 7/2014 |
| CN | 204369333 U | 6/2015 |
| CN | 205419354 U | 8/2016 |
| CN | 106185498 A | 12/2016 |
| CN | 106660739 A | 5/2017 |
| EP | 1779326 B1 | 1/2013 |
| JP | 2002179347 A | 6/2002 |
| JP | 2007261763 A | 10/2007 |
| KR | 20060057151 A | 5/2006 |
| KR | 20070005277 A | 1/2007 |
| KR | 20160109186 A | 9/2016 |
| WO | 0075062 A1 | 12/2000 |
| WO | 2006022701 A2 | 3/2006 |
| WO | 2006041467 A1 | 4/2006 |
| WO | 2006059983 A2 | 6/2006 |
| WO | 2007046807 A1 | 4/2007 |
| WO | 2013058734 A1 | 4/2013 |
| WO | 2013112134 A1 | 8/2013 |
| WO | 2013191705 A1 | 12/2013 |
| WO | 2014116182 A1 | 7/2014 |
| WO | 2015012787 A1 | 1/2015 |
| WO | 2015070926 A1 | 5/2015 |
| WO | 16165782 A1 | 10/2016 |
| WO | 17041823 A1 | 3/2017 |

OTHER PUBLICATIONS

"Introducing the PORT personal occupant requirement terminal"; www.schindler.com; 9 pages.

"RFID Attendance System With SMS Notification"; http://nevonprojects.com/rfid-attendance-system-with-sms-notification/; 8 pages.

Office Action for Chinese Patent Application No. 201810568036.8, Application Filing Date Jun. 4, 2018; dated Feb. 3, 2020 (15 pages).

* cited by examiner

ELEVATOR NOTIFICATIONS ON MOBILE DEVICE ASSOCIATED WITH USER IDENTIFICATION DEVICE

BACKGROUND

Exemplary embodiments pertain to elevator systems, and more particularly, to elevator control systems associated with destination dispatching.

Destination dispatch control systems may be implemented in elevator systems to facilitate elevator car assignments in response to a floor selection input by user. For example, a destination dispatch control system may provide an elevator car assignment or a list of potential elevator car assignments based on car usage and user demand. Accordingly, destination dispatch control systems may improve elevator system efficiency and decrease user wait times.

Convention destination dispatch control systems provide a calculated optimal car assignment by analyzing predetermined parameters, sometimes leading to car assignments that are not aligned with a user's preferences at a given time, such as desired car occupancy, wait time, and travel time. At times, one or more elevator cars may become unavailable. Therefore, a user must be reassigned to the next available elevator car.

BRIEF DESCRIPTION

According to a non-limiting embodiment, an elevator dispatch control system is configured to control an elevator system. The elevator dispatch control system comprises an elevator system database configured to store a device identifier of an electronic user identification (UserID) device assigned to an authorized user of the elevator system, and contact information of a user device assigned to a given UserID device assigned to the authorized user. The dispatch control system further includes an electronic UserID detection device configured to detect a UserID device and extract the device identifier, and an electronic ride request unit configured to detect a ride request of a user. An electronic elevator controller is in communication with the UserID device and the ride request unit. The elevator controller is configured to determine contact information of the user based on a comparison between the extracted device identifier and the plurality of stored device identifiers, and to transmit elevator car assignment information to the user device associated with the UserID device based the determined contact information.

In addition to one or more of the features described above, or as an alternative, the elevator car assignment information includes a message notification including at least one of a short-message-service (SMS) text message, web-based text message, and online instant chat message identifying an initial elevator car assigned to perform the ride request.

In addition to one or more of the features described above, or as an alternative, the elevator controller transmits a second SMS text message that contains reassignment information in response to determining a modification of the ride request.

In addition to one or more of the features described above, or as an alternative, the reassignment information identifies a different elevator car from the initial elevator car.

In addition to one or more of the features described above, or as an alternative, the user device is a cellular telephone.

In addition to one or more of the features described above, or as an alternative, the cellular telephone receives the assignment information without launching a software application.

In addition to one or more of the features described above, or as an alternative, the elevator controller determines the user is an authorized user when the extracted device identifier matches a stored device identifier in the elevator system database, and determines the user is an unauthorized user when the extracted device identifier is excluded from the elevator system database.

In addition to one or more of the features described above, or as an alternative, the elevator control system refrains from assigning an initial elevator car to the unauthorized user.

According to another non-limiting embodiment, a method of controlling an elevator system is provided. The method comprises storing, in an elevator system database, a device identifier of a user identification (UserID) device assigned to an authorized user of the elevator system, and contact information of a user device assigned to a given UserID device assigned to the authorized user. The method further includes detecting, via an electronic UserID detection device, a UserID device and extracting the device identifier in response to detecting the UserID device. The method further includes detecting a ride request of a user, and determining, via an electronic elevator controller, contact information of the user based on a comparison between the extracted device identifier and the plurality of stored device identifiers. The method further includes transmitting elevator car assignment information to the user device associated with the UserID device based the determined contact information.

In addition to one or more of the features described above, or as an alternative, the method further includes transmitting the elevator car assignment information includes transmitting a short-message-service (SMS) text message identifying an initial elevator car assigned to perform the ride request.

In addition to one or more of the features described above, or as an alternative, the method further includes transmitting a second SMS text message that contains reassignment information in response to determining a modification of the ride request.

In addition to one or more of the features described above, or as an alternative, the reassignment information identifies a different elevator car from the initial elevator car.

In addition to one or more of the features described above, or as an alternative, the method further includes displaying the SMS text message using a display screen installed on a cellular telephone.

In addition to one or more of the features described above, or as an alternative, the method further includes displaying the SMS text message without launching a software application.

In addition to one or more of the features described above, or as an alternative, the elevator controller determines the user is an unauthorized user when the extracted device identifier is excluded from the elevator system database, and refrains from assigning an initial elevator car to the unauthorized user.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures A detailed description of one or more embodiments of the disclosed apparatus and method are presented herein by way of exemplification and not limitation with reference to the Figures. The following description is merely illustrative in nature and is not intended to limit the present disclosure, its application or uses. It should be understood that throughout the drawings, corresponding reference numerals indicate like or corresponding parts and features.

As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality Referring first to an overview of technologies that are more specifically relevant to aspects of various embodiments described herein, the increase in mobile device technologies have presented users with the capability to interact with the elevator using software applications (i.e., apps) loaded on mobile smart devices such as, for example, smartphones, and smart watches. Therefore, a user can submit a dispatch request or ride request without the need to wait until a central dispatch unit or dispatch kiosk becomes available.

In addition, users can input an assignment request at a central kiosk, for example, and then receive assignment information via the app indicating the assigned elevator and destination floor. However, some users may possess a mobile device that is not a smart device. For instance, legacy mobile phones are capable of performing various mobile communication operations such as conducting telephone calls, sending/receiving text messages, etc. These legacy mobile phones, however, typically do not employ the computing hardware and/or operating system needed to execute apps. Therefore, a user in possession of a legacy mobile phone is incapable of loading and operating the app necessary to interact with the elevator system.

Turning now to an overview of various features of the present disclosure, one or more non-limiting embodiments provide a dispatch control system that informs a user's mobile device of an elevator car assignment without requiring install of a smart device app. In at least one non-limiting embodiment, a user's mobile device receives a message notification indicating the elevator car assignment. The message notification includes, but is not limited to, a short-message-service (SMS) text message via a short message service (SMS) protocol, a local area network (LAN) instant message, a web-based text message, and an online or Internet-based instant chat message such as WeChat, for example, or an email. The text message contains the elevator car assigned to the user along with the destination floor. In this manner, a user is not required to revisit the central kiosk to obtain confirmation of the assigned elevator and/or the destination floor.

According to another embodiment, a user receives a text message indicating an elevator car reassignment when the elevator dispatch control system determines that the initially assigned elevator car in unavailable or unable to perform the user's initial ride request. In this manner, the user is conveniently reassigned to an available elevator car without the need of a software app or smart device.

Figure 1:
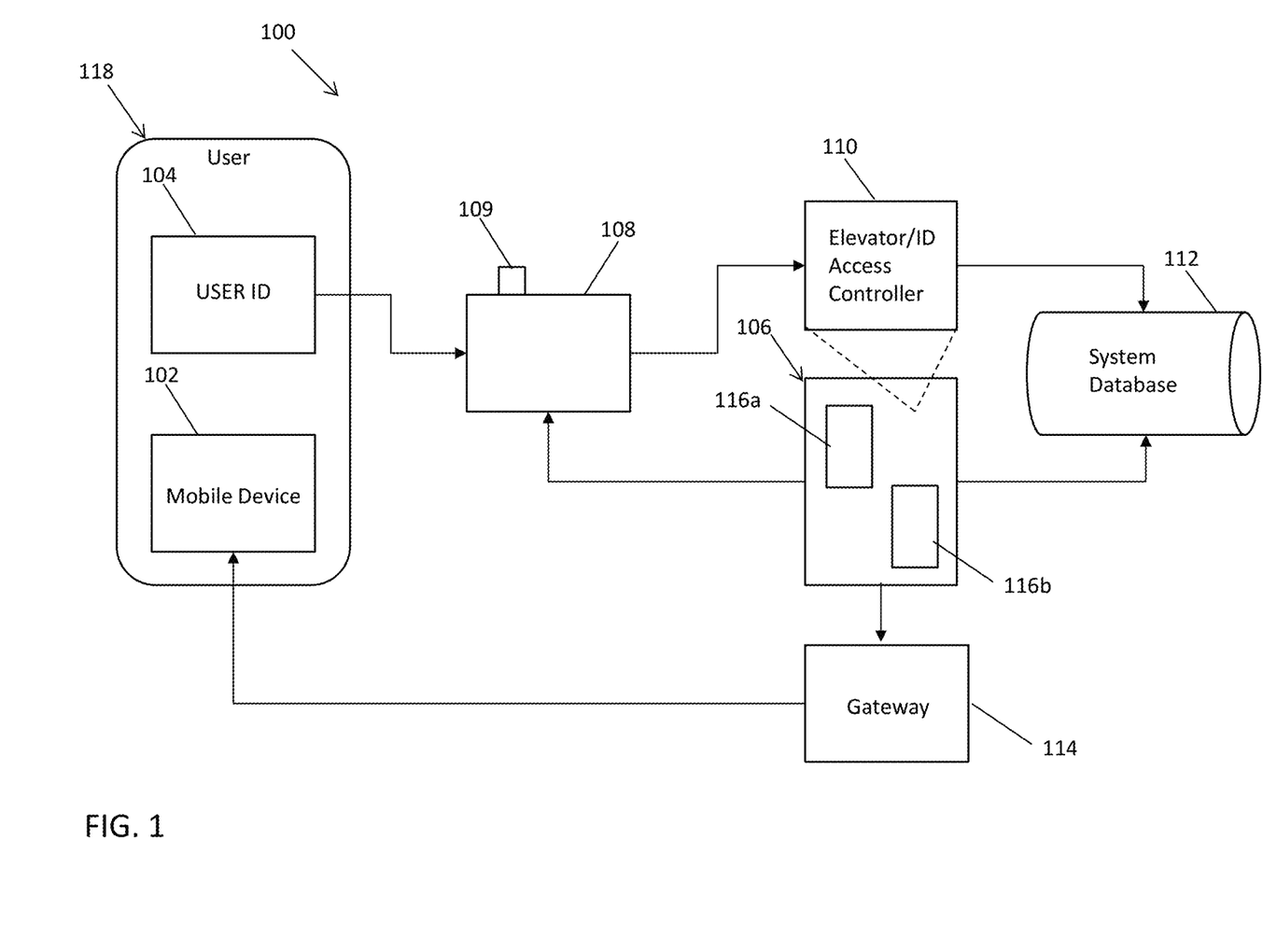
FIG. 1 is block diagram illustrating an elevator dispatch control system according to a non-limiting embodiment.

With reference now to FIG. 1, an elevator dispatch control system 100 is illustrated according to a non-limiting embodiment. The elevator dispatch control system 100 is configured to transmit elevator car assignment information to a user device 102 associated with a mobile user identification (UserID) device 104. The elevator dispatch control system 100 includes an elevator system 106, an electronic ride request unit 108, an electronic elevator/ID access controller 110, an elevator system database 112, and a data communication gateway 114.

The elevator system 106 can be installed within a structure (e.g., a building). In some embodiments, the structure may be an office building or a collection of office buildings that may or may not be physically located near each other. The structure may include any number of floors that are accessible by one or more elevator cars 116*a* and 116*b*, and thus the structure can include any number of landings. Persons 118 (i.e., elevator system users 118) may approach a landing located at a given floor and may travel to a destination floor via the elevator cars 116*a* and 116*b*.

The elevator cars 116*a*-116*b* can be located in the same hoistway or in different hoistways which allows coordination among elevator cars 116*a*-116*b* in different elevator banks servicing different floors (e.g., sky lobbies, etc.). Although two elevator cars 116*a*-116*b* are shown in FIG. 1, it should be appreciated that any number of elevators cars may be employed in the elevator system 106 and building systems that employ embodiments of the present disclosure. The elevators cars 116*a*-116*b* may be employed in any configuration with all elevators servicing all floors of the building, some elevator cars only servicing certain floors, a first group of elevator cars servicing lower floors of a building and a sky lobby and a second group of elevator cars servicing the sky lobby and upper floors of the building, etc.

The elevator system 106 can include various features as described above with reference to FIG. 1 and may also include other non-depicted elements and/or features as known in the art. For example, the elevator system 106 can include various machine components configured to drive the elevator cars including, but not limited to, traction components, drive assemblies, a drive controller, sheaves, motors, counterweight, ropes, cables, braking mechanisms, safeties, etc.). The drive controller (not shown) can determine and store the operating status of one or more particular elevator controllers it controls. In addition, the drive controller can include a transceiver that receives and/or transmits electronic data. In this manner, the elevator system 106 can be controlled by the elevator/ID access controller 110 when it is remotely located from the machine components.

The elevator/ID access controller 110 is in signal communication with the elevator system 106 (e.g., the drive controller), and the elevator system database 112. The elevator/ID access controller 110 may be configured to control dispatching operations of one or more elevator cars 116*a* and 116b installed in the elevator system 106. It is understood that the elevator system 106 may utilize more than one elevator/ID access controller 110, and that each elevator controller may control a group of elevators cars.

The elevator system database 112 can store software and/or algorithms to be retrieved by the elevator/ID access controller 110. The elevator system database 112 can also store up-to-date information regarding the operating status of the elevator system 106. For example, the elevator system database 112 can store information indicating the current operating status of one or more elevators cars 116a-116b, the status of one or more floors, the number of user devices 102 connected to the elevator dispatch control system 100 (e.g., in signal communication with the elevator controller 110), and the detected floor location of one or more of the user devices 102. Although a single elevator system database 112 is illustrated, it should be appreciated that additional elevator system database 112 may be employed in the elevator dispatch control system 100 and/or in a cloud server (not shown in FIG. 2) which is accessible by the dispatch control system 100 via the data communication gateway 114.

In at least one embodiment, the elevator system database 112 stores a look up table (LUT) which cross-references a given UserID device 104 assigned to a user 118 to the contact information (e.g., cellular telephone number) of a user device 102. For example, an identity (e.g., Bob Smith) of a first user 118 may be assigned a first UserID device 104. The UserID device 104 is assigned its own unique device serial number (e.g., xyz). The serial number of the UserID device 104 and the identity of the first user 118 are obtained and added to the LUT stored in the elevator system database 112. The device serial numbers can also be utilized to indicate authorized users of the elevator system 106. Thus, the elevator control system 100 can deny service if a scanned serial number is excluded from the LUT.

In addition, the contact information (e.g., cellular telephone number) of the first user 118 is obtained and added to LUT to correspond with the serial number of the UserID device 104 and the identity of the first user 118. In this manner, when a given UserID device 104 is detected by the UserID device detector 109, the elevator/ID access controller 110 can search the LUT for the corresponding serial number (e.g., xyz) and obtain the contact information associated with the user device 102. The contact information can include, for example, a cellular telephone number and/or a user message identification (e.g., ID name or UserID) associated with a text messaging service (e.g., WeChat user ID, instant messenger ID, etc.), email address, etc.

The ride request unit 108 is in signal communication with the elevator/ID access controller 110. The request unit 108 can be constructed in various manners including, but not limited to, a central kiosk or wall-mounted input unit. A user manipulates the ride request unit 108 to input a ride request, which is then output the elevator/ID access controller 110. The ride request can include, but is not limited to, a current floor location of the user and/or a destination floor. In at least one embodiment, the current floor of the user is automatically detected by the elevator control system 100 and/or the ride request unit 108 (e.g., in response to detecting the UserID device 104), and the user may input only the destination floor at the ride request unit 108. The elevator/ID access controller 110 receives the ride request, determines an available elevator car 116a-116b capable of completing the ride request, and dispatches an elevator car 106a-106b to user's floor location.

The ride request unit 108 may further include a UserID device detector 109. The UserID device detector 109 can be any detection device, scanning device and/or sensor capable of detecting the presence of the UserID device 104, and obtaining data in response to detecting the UserID device 104. Although the UserID device detector 109 is illustrated as being coupled to the ride request unit 108, it should be appreciated that the UserID device detector 109 may be located remotely from the ride request unit 108.

The UserID device 104 can include a radio-frequency identification (RFID) device, which uses electromagnetic fields to automatically identify and track tags attached to objects. The RFID device 104 stores information, which is then transmitted to the UserID device detector 109 in response to being detected. The RFID device 104 can be detected when located in close proximity with the UserID device detector 109 without requiring physical contact of direct line of sight. The UserID device 104 can also include a scan card including a magnetic strip which delivers stored information in response to swiping the card at the UserID device detector 109. The UserID device 104 can also include a scannable image tag or code such as a bar code or quick response (QR) code, which can transfer data in response to being optically scanned by the UserID device detector 109. In any case, the UserID device detector 109 can obtain data from the UserID device 104, and deliver the data to the elevator/ID access controller 110 for further processing as described below.

The data communication gateway 114 establishes signal communication between the elevator dispatch control system 100 and the user device 102. The gateway 114 includes, but is not limited to, a router (e.g., wireless router), an access point, a receiver (e.g., a WiFi receiver), etc. The gateway 114 may be located inside an elevator car 116a-116b (e.g., an elevator car, in proximity to an elevator landing, at points of egress to a building, and/or outside of the building). While a single gateway 114 is shown in FIG. 1, more than one gateway may be present in some embodiments. The gateway 114 facilitates data transfer between various components of the elevator dispatch control system and the user device 102. The data includes, but is not limited to, elevator assignment data, floor location data and a destination floor data. For example, the gateway 114 may obtain an identifier associated with the user device 102 and the current floor location of the user device 102, and may deliver an elevator car assignment ID indicating a particular elevator car 116a-116b selected to perform a ride request corresponding to a user 118.

Still referring to FIG. 1, a user device 102 can operate in conjunction with the elevator dispatch control system 100 to receive elevator assignment information. In at least one non-limiting embodiment, the user device 102 receives assignment information following detection of the UserID device 104. For example, when a user's UserID device 104 is detected (e.g., the user's RFID device 104 is scanned by the UserID device detector 109), the elevator dispatch control system 100 (e.g., the elevator/ID access controller 110) searches the database 112 for the corresponding UserID device serial number (e.g., xyz) and obtains the corresponding user device contact information. The user device contact information includes, for example, the user's cellular telephone number and/or a user's message identification (e.g., ID name or UserID) associated with their text messaging account. The elevator dispatch control system 100 determines an available elevator car 106a-106b capable of performing the user's ride request and dispatches the elevator car to the user's current floor. The user's floor can be determined, for example, as the floor at which UserID device 104 was detected.

Prior to dispatching the assigned elevator car 106a-106b, or following dispatch, the elevator dispatch control system 100 generates assignment information and transmits the assignment information to the user device 102 via the data communication gateway 114. In at least one non-limiting embodiment, the elevator dispatch control system 100 transmits a message notification such as a short-message-service (SMS) text message, for example, containing the assignment information to the cellular telephone number that corresponds to the serial number (e.g., xyz) of the detected UserID device 102. Other message notifications, including those discussed above, may be employed. In response to receiving the SMS text message, the user device 102 displays the assignment information. Accordingly, the user device 102 can display the assignment information (e.g., SMS text message identifying the assigned elevator car) without launching a software application (app), or without having a particular app stored on the phone all together. In this manner, legacy cellular telephones incapable of operating apps can still receive assignment information associated with their input ride request.

In at least one non-limiting embodiment, the elevator dispatch control system 100 can also determine when a user's initial ride request is modified or cannot be completed. For example, the 110 the elevator/ID access controller 110 may determine that the assigned elevator car (e.g., 106a) becomes disabled prior to reaching the user's floor location. In response to detecting the unavailability of the originally assigned elevator car, the elevator/ID access controller 110 determines a new elevator car (e.g., 106b) capable of completing the initial ride request, and reassigns the user 118 to the new elevator car. The elevator/ID access controller 110 can then transmit another SMS text message to the user device 102, which displays the reassignment information (e.g., the newly assigned elevator car 106b). The user 118 is therefore notified of the modified ride request and can proceed to the reassigned elevator car that will complete the initial ride request.

In one or more non-limiting embodiments, the operations of generating and transmitting reassignment information can be performed automatically by the 110 the elevator/ID access controller 110. In other embodiments, the elevator/ID access controller 110 can request the user 118 (e.g., via SMS text message) to return to the ride request unit 108 and manually reinput the ride request based on a number of automatic reassignment attempts. For example, the elevator/ID access controller 110 can send the reinput ride request SMS text message when a number of automatic reassignment attempts performed by the elevator/ID access controller 110 exceeds a reassignment threshold value. The reassignment threshold value can be manually set by a technician, for example, and stored in the elevator/ID access controller 110 and/or elevator system database 112.

Figure 2:
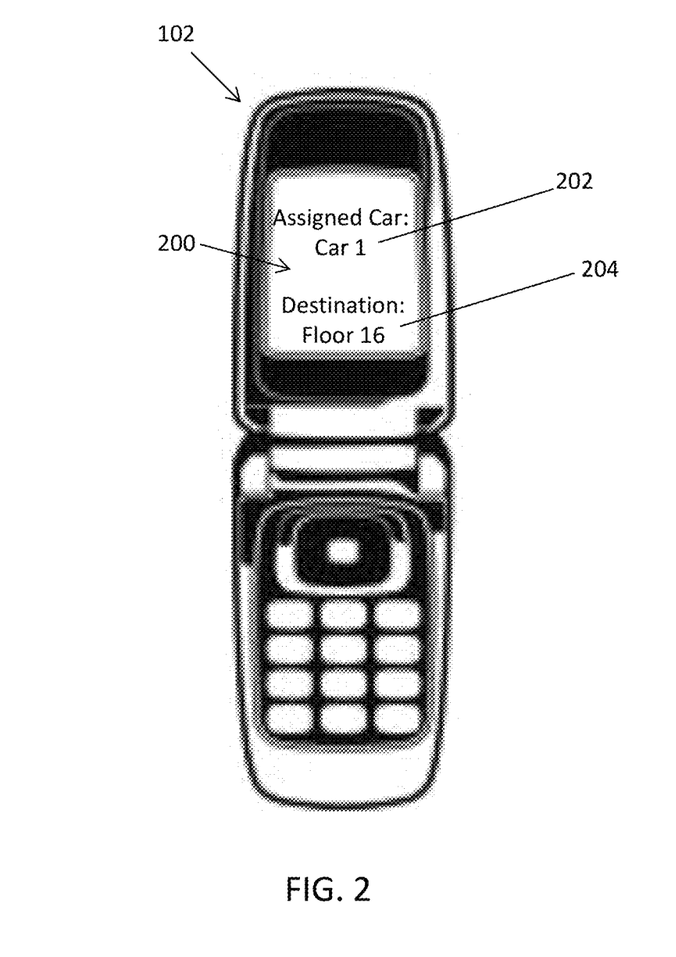
FIG. 2 illustrates a user device displaying elevator assignment information received from an elevator dispatch control system according to a non-limiting embodiment.

Referring now to FIG. 2, a user device 102 is illustrated after receiving assignment information from the elevator dispatch control system according to a non-limiting embodiment. In response to receiving a message notification such as a SMS text message, for example, the user device 102 displays the corresponding assignment information on the display screen 200. The assignment information includes, for example, car assignment information 202 indicating the elevator car assigned to the user to perform the pending ride request, and destination floor information 204 indicating the destination floor designated by the user.

Figure 3:
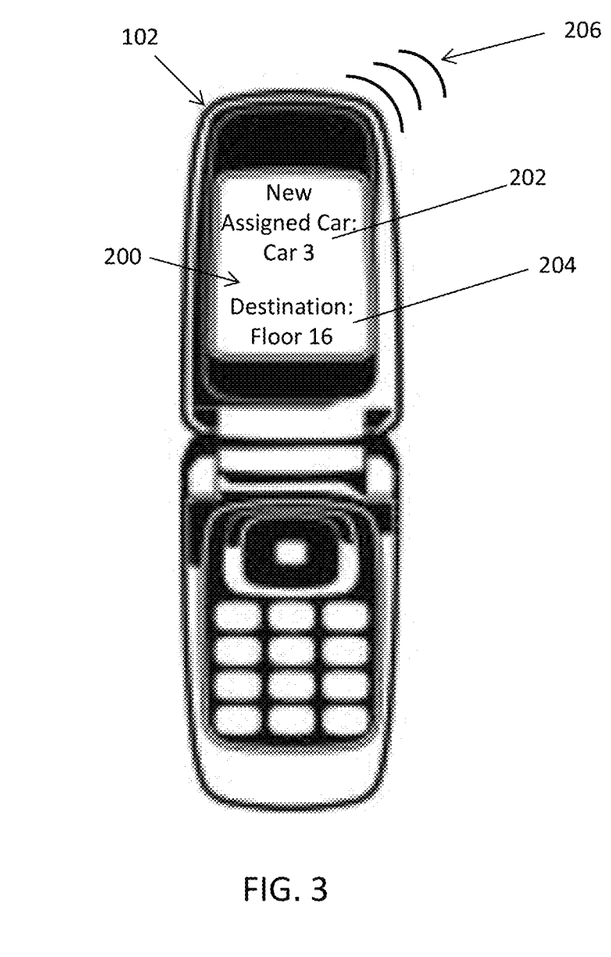
FIG. 3 illustrates a user device displaying elevator reassignment information received from an elevator dispatch control system according to a non-limiting embodiment.

Turning to FIG. 3, the user device 102 is illustrated following a modification of the user's original ride request according to a non-limiting embodiment. For example, the user's originally assigned elevator car (e.g., car 1) may become disabled after transmitting the assignment information to the user device 102 (see FIG. 2). Accordingly, the elevator dispatch control system determines a different elevator car (e.g., car 3) capable of performing the user's original ride request, and transmits a message notification (e.g., SMS text message) containing reassignment information. In this scenario, for example, the reassignment information includes the new elevator car (e.g., car 3) reassigned to the user. In response to receiving the subsequent SMS text message, for example, the user device 102 displays the corresponding reassignment information on the display screen 200, which indicates new elevator car (e.g., car 3) assigned to the user.

Figure 4:
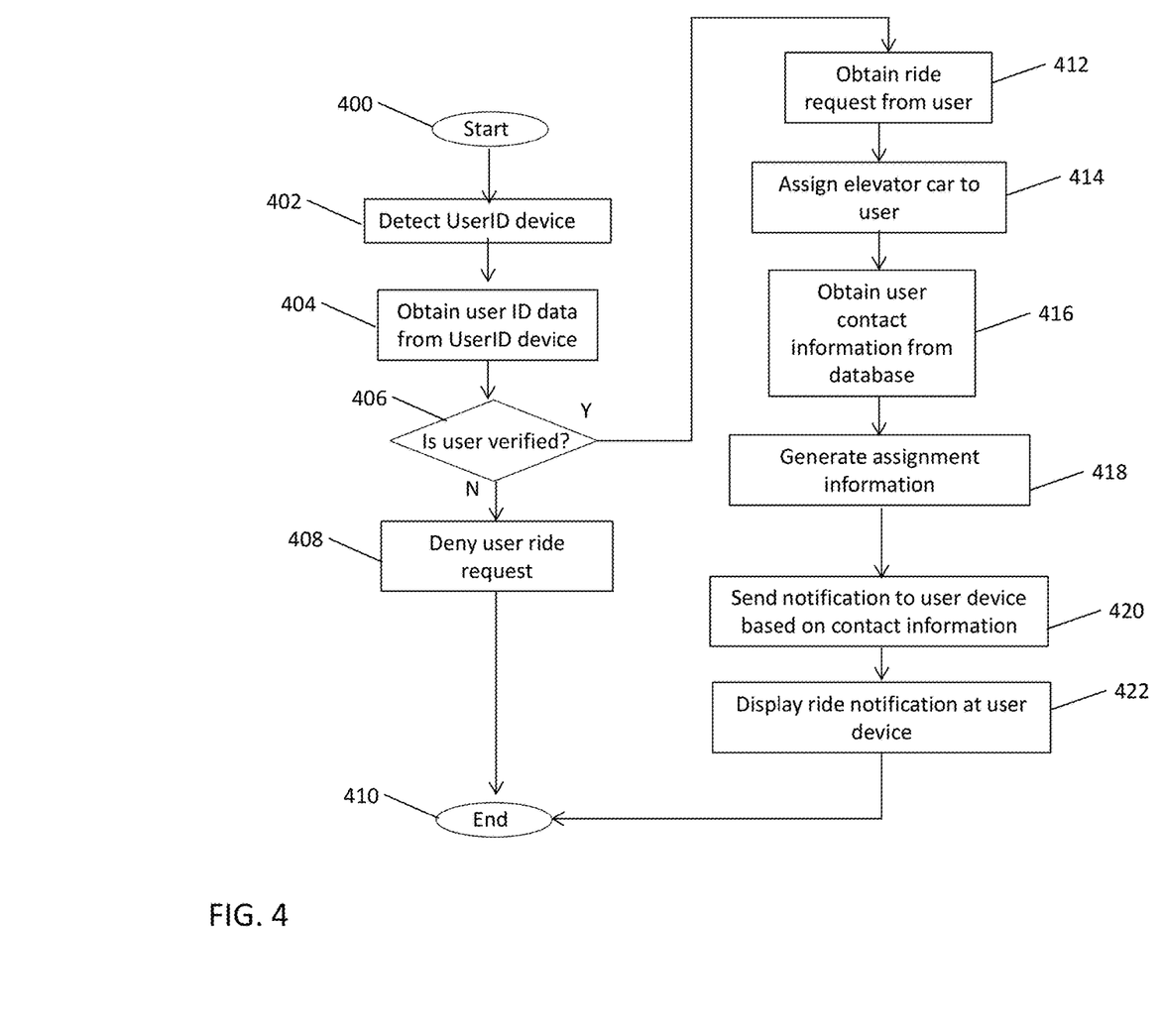
FIG. 4 is flow diagram illustrating a method of notifying an elevator system user of an elevator assignment according to a non-limiting embodiment.

With reference now to FIG. 4, a flow diagram illustrates a method of notifying an elevator system user of an elevator assignment according to a non-limiting embodiment. The method begins at operation 400, and at operation 402 a UserID device such as an RFID device, a scanning card, a device including a scannable image code, etc., is detected. At operation 404, an identity of an elevator system user is determined in response to detecting the UserID device. At operation 406, the identified user is verified as an authorized user of the elevator system. When the identified user is not authorized to use the elevators system, the user is denied service at operation 408, and the method ends at operation 410.

When, however, the identified user is verified as an authorized user of the elevator system, the user is permitted to input a ride request at operation 412. The ride request includes, for example, inputting a floor location of the user and/or a destination floor. In at least one embodiment, the current floor of the user is automatically detected by the elevator control system (e.g., in response to detecting the UserID device), and the user may input only the destination floor. At operation 414, an elevator car for performing the input ride request is assigned to the user. At operation 416, contact information corresponding to a user device is obtained. The contact information includes, for example, a cellular telephone number of a cellular phone possessed by the user, and/or a user's message identification (e.g., ID name or userID) associated with their text messaging account. At operation 418, the elevator dispatch control system generates assignment information based on the ride request. The assignment information includes, for example, an elevator car identifier (ID) indicating the elevator car assigned to the user and the destination floor input by the user. At operation 420, a message notification such as a SMS text message, for example, is transmitted from the elevator dispatch control system to the user device according to the contact information. At operation 422, the user device displays the assignment information contained in the SMS text message, and the method ends at operation 410.

Accordingly, various non-limiting embodiments described above provide a notification system that notifies an elevator system user of their assigned elevator car and a pending destination floor without the need to stand in the proximity of a central kiosk or revisit a central kiosk should the user wish to reconfirm their assignment information. Further, the user can obtain assignment information from the elevator dispatch control system without the need to own a smartphone or other smart device, or without downloading a specific software application for establishing communication with the elevator dispatch control system.

Although the example above describes a modification of the user's original ride request in terms of a change in the availability of the user's originally assigned elevator car, the notification of a modified ride request is not limited thereto. For example, the ride request modification may include a change in the availability of the user's destination floor. In this scenario, reassignment information (e.g., a SMS text message) can be sent to the mobile device 102 indicating the original destination floor is unavailable and can request the examiner to input another destination floor.

In at least one non-limiting embodiment, the user device 102 generates a dispatch notification alert 206 in response to receiving the reassignment information (e.g., the SMS text message). The dispatch notification alert 206 includes, but is not limited to, a sound, vibration, and/or light. In this manner, the user can be notified a change in the initial ride request, and can quickly and conveniently travel to the new elevator car assigned to complete the ride request.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An elevator dispatch control system configured to control an elevator system, the elevator dispatch control system comprising:
   an elevator system database configured to store a device identifier of an electronic user identification (UserID) device assigned to an authorized user of the elevator system, and contact information of a user device assigned to a given UserID device assigned to the authorized user;
   an electronic UserID detection device configured to detect a UserID device and extract the device identifier;
   an electronic ride request unit configured to detect a ride request of a user; and
   an electronic elevator controller in communication with the UserID device and the ride request unit, the elevator controller configured to determine contact information of the user based on a comparison between the extracted device identifier and the plurality of stored device identifiers, and to transmit elevator car assignment information to the user device associated with the UserID device based on the determined contact information.

2. The elevator dispatch control system of claim 1, wherein the elevator car assignment information includes an electronic message notification identifying an initial elevator car assigned to perform the ride request, the electronic message notification including at least one of a short-message-service (SMS) text message, a local area network (LAN) instant message, a web-based text message, an Internet-based instant chat message, and an email.

3. The elevator dispatch control system of claim 2, wherein the elevator controller transmits a second SMS text message that contains reassignment information in response to determining a modification of the ride request, and wherein the UserID device displays the second SMS text message without interacting with a software application.

4. The elevator dispatch control system of claim 3, wherein the reassignment information identifies a different elevator car from the initial elevator car.

5. The elevator dispatch control system of claim 4, wherein the user device is a cellular telephone.

6. The elevator dispatch control system of claim 5, wherein the cellular telephone receives the assignment information without launching a software application.

7. The elevator dispatch control system of claim 1, wherein the elevator controller determines the user is an authorized user when the extracted device identifier matches a stored device identifier in the elevator system database, and determines the user is an unauthorized user when the extracted device identifier is excluded from the elevator system database.

8. The elevator dispatch control system of claim 1, wherein the elevator control system refrains from assigning an initial elevator car to the unauthorized user.

9. A method of controlling an elevator system, comprising:
   storing, in an elevator system database, a device identifier of an electronic user identification (UserID) device assigned to an authorized user of the elevator system, and contact information of a user device assigned to a given UserID device assigned to the authorized user;
   detecting, via an electronic UserID detection device, a UserID device and extracting the device identifier in response to detecting the UserID device;
   detecting a ride request of a user;
   determining, via an electronic elevator controller, contact information of the user based on a comparison between the extracted device identifier and the plurality of stored device identifiers; and
   transmitting elevator car assignment information to the user device associated with the UserID device based the determined contact information.

10. The method of claim 9, wherein transmitting the elevator car assignment information includes:
    transmitting a short-message-service (SMS) text message identifying an initial elevator car assigned to perform the ride request, and
    displaying the SMS text message without interacting with a software application.

11. The method of claim 10, further comprising transmitting a second SMS text message that contains reassignment information in response to determining a modification of the ride request.

12. The method of claim 11, wherein the reassignment information identifies a different elevator car from the initial elevator car.

13. The method of claim 12, further comprising displaying the SMS text message using a display screen installed on a cellular telephone.

14. The method of claim 13, further comprising displaying the SMS text message without launching a software application.

15. The method of claim 9, wherein the elevator controller determines the user is an unauthorized user when the extracted device identifier is excluded from the elevator system database, and refrains from assigning an initial elevator car to the unauthorized user.

* * * * *